United States Patent [19]

McClure

[11] Patent Number: 4,846,391
[45] Date of Patent: Jul. 11, 1989

[54] BOILER WALL TUBE TOOL

[76] Inventor: Gary W. McClure, Rte. 7, Box 228-A, South Charles, W. Va. 25309

[21] Appl. No.: 260,293

[22] Filed: Oct. 20, 1988

[51] Int. Cl.⁴ .......................................... B23K 37/04
[52] U.S. Cl. ................... 228/49.3; 228/119; 228/44.5; 29/272; 29/464; 29/468; 269/153; 269/229; 269/265
[58] Field of Search ............... 228/49.3, 44.5, 119, 228/183; 29/464, 468, 33 T, 272; 269/43, 153, 229, 235, 265

[56] References Cited

U.S. PATENT DOCUMENTS 2,573,276 10/1951 Roberts ............................... 269/153
2,612,821 10/1952 Skay ..................................... 269/153
3,422,519 1/1969 Fehlman ............................. 228/44.5
4,047,659 9/1977 Vucic ................................... 228/119

Primary Examiner—Nicholas P. Godici
Assistant Examiner—Samuel M. Heinrich
Attorney, Agent, or Firm—Fleit, Jacobson, Cohn, Price, Holman & Stern

[57] ABSTRACT

This invention relates to a boiler wall tube tool in which boiler tubes in the form of a wall can be clampingly secured to retain adjacent ends of the boiler tubes forming the wall in aligned relation when connecting the ends of the boiler tubes forming the wall when being joined by welding.

9 Claims, 1 Drawing Sheet

U.S. Patent
Jul. 11, 1989
4,846,391
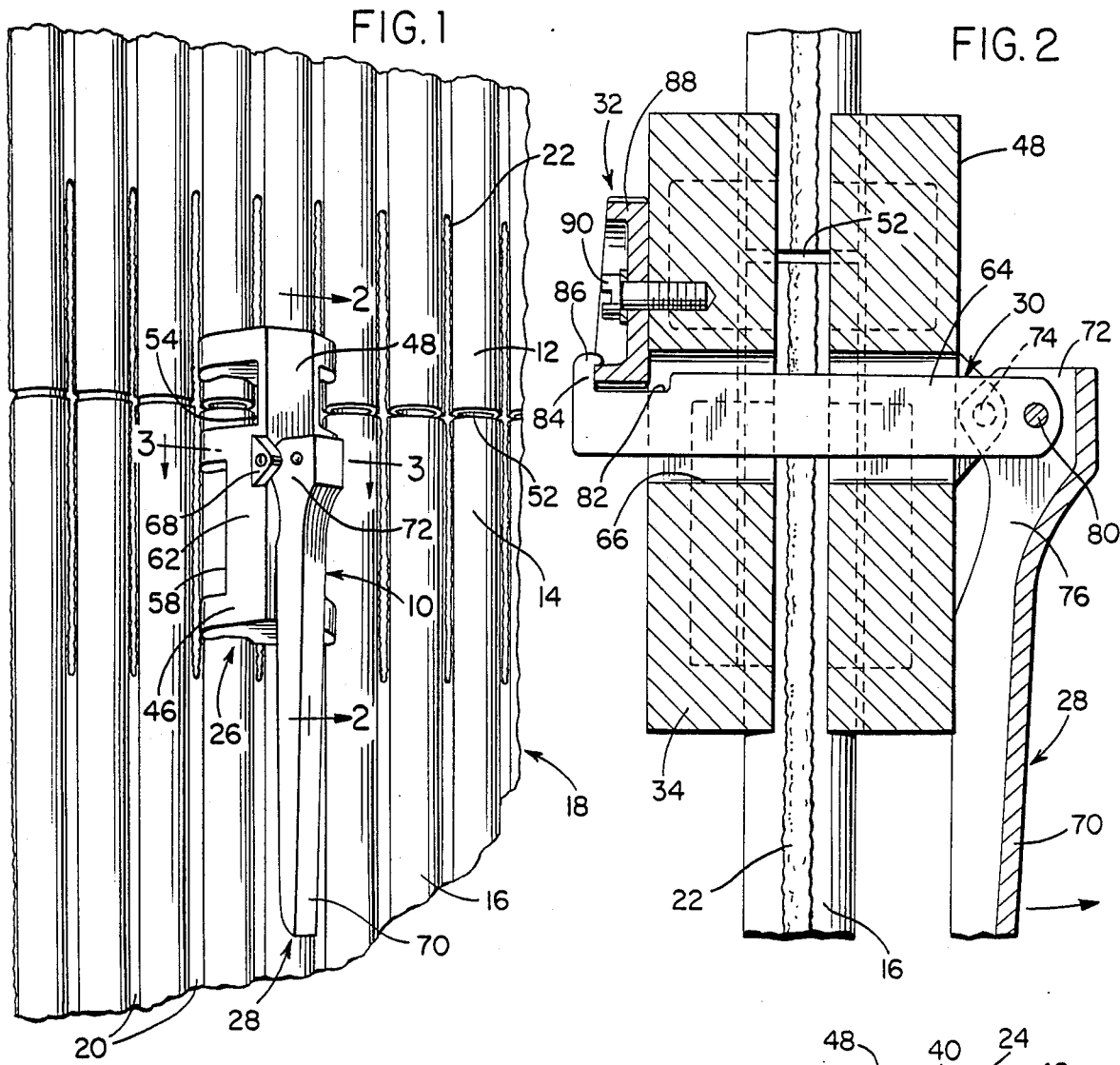
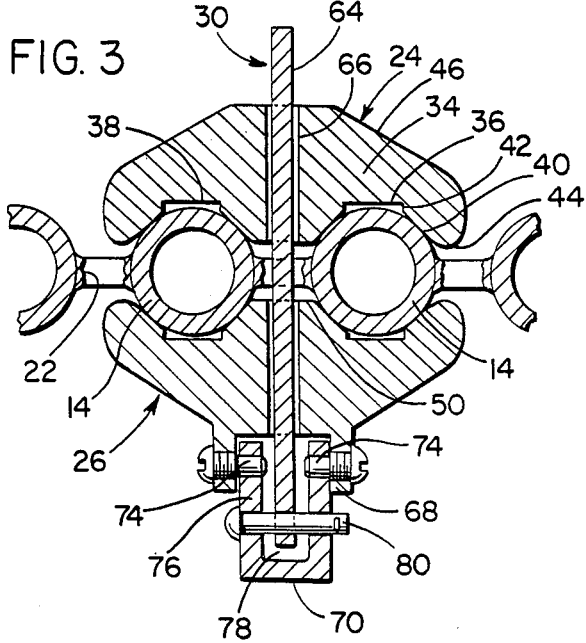
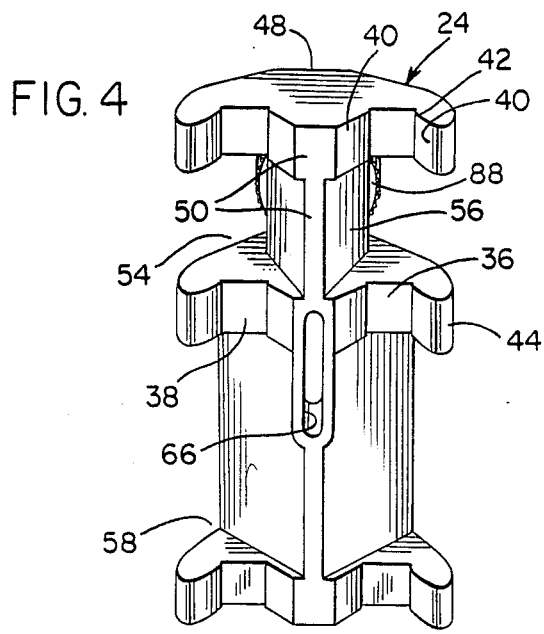

BOILER WALL TUBE TOOL

BACKGROUND OF THE INVENTION

1. Field of the Invention

The present invention generally relates to a tool for use in clampingly securing the ends of boiler tubes in aligned relation to enable the ends of the boiler tubes to be joined together by welding. More specifically, this invention relates to a boiler wall tube tool in which boiler tubes in the form of a wall can be clampingly secured to retain adjacent ends of the boiler tubes forming the wall in aligned relation when connecting the ends of the boiler tubes forming the wall when being joined by welding.

INFORMATION DISCLOSURE STATEMENT

Tools for clamping and aligning boiler tubes when connecting the ends of the boiler tubes by welding are known as disclosed in my prior U.S. Pat. Nos. 4,493,139, 4,579,272 and 4,722,468. The devices disclosed in the above-mentioned patents include structures for securing boiler tube ends in aligned and adjacent relation and function effectively when the boiler tubes are in spaced relation. However, in boiler wall tubes, the boiler tubes are positioned in closely spaced relation and are interconnected by webs to form a continuous boiler tube sheet or wall. The tools disclosed in the above-mentioned patents are not especially adapted for use with boiler tubes forming a boiler wall.

SUMMARY OF THE INVENTION

An object of the present invention is to provide a boiler wall tube tool for clampingly securing adjacent ends of boiler tubes in aligned and adjacent relation when the ends of the tubes are being connected by welding and the boiler tubes form a tube wall in the boiler.

Another object of the invention is to provide a tool in accordance with the preceding object which includes a pair of opposed clamp members to clampingly engage a pair of adjacent ends of boiler tubes to retain them in aligned and adjacent relation with each of the clamp members including a recessed area providing access to the ends of the boiler tubes for welding.

A further object of the invention is to provide a boiler wall tube tool which includes a pair of clamp members and a manually pivotal handle and cam structure for moving the clamp members into clamping engagement with the adjacent ends of boiler tubes.

Still another object of the invention is to provide a tool in accordance with the preceding objects in which one of the clamp members includes a rotatable cam member engaged with a mounting member for the pivotal handle to adjust the working range of movement of the clamp members by varying the effective length of a mounting member for the pivotal handle.

Yet another object of the invention is to provide a tool for boiler wall tubes as set forth in the preceding objects which is simple to use, effective for its purposes and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a boiler wall tube assembly with the tool of the present invention installed in operative position thereon.

FIG. 2 is a longitudinal, vertical, sectional view taken substantially upon a plane passing along section line 2—2 on FIG. 1 illustrating the structural details of the tool.

FIG. 3 is a transverse, sectional view taken substantially upon a plane passing along section line 3—3 on FIG. 1 illustrating further structural details of the tool.

FIG. 4 is a perspective view of one of the clamping members forming the tool.

DESCRIPTION OF THE PREFERRED EMBODIMENT

Referring now specifically to the drawings, the boiler wall tube tool of the present invention is generally designated by reference numeral 10 and is utilized to clampingly secure adjacent tube ends 12 and 14 of boiler tubes 16 incorporated into a boiler tube wall generally designated by the numeral 18 in which the tubes 16 are spaced a short distance apart and connected by webs 20 which are continuous throughout the length of the tubes 16. In repair or replacement of the tubes 16, it is necessary to remove tube sections and replace them by welding the adjacent ends 12 and 14 together in a manner well understood in this art. In welding the adjacent ends 12 and 14 together, it is essential that they be securely clamped in aligned relation during the welding operation. The tool 10 of the present invention is utilized for this purpose and, in using the tool, it is necessary to form slots 22 in the webs 20 between adjacent tubes 16 as illustrated in FIG. 1 to receive a component of the tool 10 as described hereinafter.

The tool 10 includes an inner clamp member 24 and an outer clamp member 26 provided with a pivotal handle 28 connected to a mounting member 30 which interconnects the two clamp members 24 and 26. An adjustable cam structure 32 adjusts the position of the mounting member 30 in relation to the inner clamp member 24. The inner and outer clamp members 24 and 26 are substantially identical and include a substantially rectangular body 34 of rigid construction with the body 34 including a pair of recesses 36 and 38 in the inner surface thereof with each of the recesses 36 and 38 including inclined surfaces 40 terminating at their inner ends in spaced relation and slightly offset as at 42 from the bottom of the recess which is substantially transversely flat for contacting engagement with the external surface of the tubes 16 as illustrated in FIG. 3. Outwardly of the inclined surfaces 40, the body 34 includes rounded edges 44 and inclined outer surfaces 46 which terminate in an outer flat surface 48 in parallel opposed relation to an internal flat surface 50 which extends between the edges of the inner ends of the inclined surfaces 40 as illustrated in FIGS. 3 and 4. With this construction, the central portion of the clamp members 24 and 26 are thicker than the edge portions and engage adjacent tubes 16.

One end of each of the clamp members 24 and 26 engages ends 12 of two tubes 16 and the other end portion of the clamp members 24 and 26 engage the ends 14 of adjacent tubes so that when the clamp members 24 and 26 are moved towards each other, the tube ends 12 and 14 will be securely clamped in aligned and adjacent relation.

As illustrated in FIGS. 1 and 2, the clamp members are not oriented symmetrically on opposite sides of the juncture 52 between the ends 12 and 14 of the tubes 16. One end portion of each of the clamp members 24 and 26 is provided with a recess 54 which extends from the outer curved edges 44 inwardly to merge with the inner flat surface 50 and the outer flat surface 48 with inner walls 56 defining the recess 54 being inclined from the outer edges of the inner flat portion 50 in diverging relation to the outer edges of the outer flat wall portion 48. The end surfaces defining the recess 54 are parallel to each other and perpendicular to the longitudinal axis of each of the clamp members 24 and 26. As indicated, the recesses 54 are adjacent one end of the clamp members and are of sufficient length to provide access to the juncture 52 between the tube ends 12 and 14 as clearly illustrated in FIG. 1 so that the ends 12 and 14 of the tubes can be welded through the access recesses 54.

The other end portion of each clamp member is also provided with opposite recesses 58 in which the inner walls 60 forming the recesses 58 merge with the inner flat surface 50 but are spaced from the outer flat surface 48 by an inclined outer wall portion 62 as illustrated in FIG. 1. This structure reduces the overall weight of the tool and provides a structure to facilitate gripping and handling of the clamp members 24 and 26.

The mounting member 30 for the pivotal handle 28 is in the form of an elongated rigid strap or bar 64 which extends through a correspondingly shaped opening 66 of slot-like configuration located at the longitudinal and transverse center of the clamp member 24 and 26 as illustrated in FIGS. 2 and 3. The outer surface of the clamp member 26 having the pivotal handle 28 attached thereto is provided with a pair of laterally projecting lugs 68 integral therewith and the pivotal handle 28 includes an elongated tapered handle member 70 having a right angularly disposed end portion 72 pivoted to the lugs 68 by a pair of pivot pins 74. The end portion 72 of the handle member 70 is formed by a pair of spaced members 76 which define a space 78 therebetween to receive the mounting bar or strap 64 which extends upwardly therebetween and is pivoted to the members 76 by a pivot pin 80. The pivot pin 80 is spaced from the pivot pin 74 whereby pivotal movement of the handle member 70 will cause the mounting member or strap 64 to be moved longitudinally in order to clamp the clamp members 24 and 26 and to also loosen them inasmuch as the other end of the mounting member 64 or strap is connected with the outer surface of the clamp member 24 by the use of the adjustable cam structure 32.

The adjustable cam structure 32 includes a laterally extending notch 82 in one edge of the mounting member or strap 64 which defines a lateral tongue 84 on the outer side edge thereof which includes an inwardly extending hook 86. The mounting member 64 may be provided with a notch or the tongue may be formed by a lateral projection on the end portion of the strap member 64. In either event, an inwardly extending hook 86 is provided which is engaged by a circular axial cam member 88 in the form of a disc that is rotatably secured to the outer surface 48 of the clamp member 24 by a pivot pin or bolt 90. The outwardly facing surface of the cam 88 includes a cup-shaped recess 91 which receives the hook 86 and an inclined cam surface 92 which is inclined gradually from a low point to a high point on the axial outer surface of the cam 88. As the cam 88 is rotated engagement of the cam surface 92 with the inwardly extending hook 86 will adjust the position of the mounting member 64 in relation to the clamp members 24 and 26 thereby enabling the clamp members to be utilized with different sizes of boiler tubes.

When removing and replacing a section of boiler wall tubing, the webs 20 between adjacent tubes 16 are slotted or removed in the adjacent ends 12 and 14 of the tubes 16 to be connected. This enables the clamp member 24 to be positioned against the interior of the boiler tube wall 18 with adjacent tubes 16 received in the recesses 36 and 38. The outer clamp member 26 may then be positioned against the exterior of the boiler tube wall 18 with the mounting strap 64 extended through the slot 66 and the notch or tongue 84 engaging the cam surface 92 of the cam 88 which may be adjusted to snug but not clamp the clamp members in place. The handle member 70 can then be pivoted with the eccentric spaced relation of the pivot pins 74 and 80 causing the pivot pin 80 which moves in an arcuate path about pivot pin 74 pulling the mounting member or strap 64 and exerting inward pressure on the clamp member 26 thereby rigidly and securely clamping the adjacent ends 12 and 14 of the tubes 16 in aligned relation with the recesses 54 providing access to the juncture 52 for connecting the tubes 16 by welding. After initial welding has been obtained, the tool can be removed and the welding connecting completed in a well-known manner.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A boiler wall tube tool comprising a pair of opposed clamp members with each clamp member including a pair of recesses therein to engage adjacent ends of a pair of boiler wall tubes on opposite sides of a juncture between the adjacent ends, means moving the clamp members towards each other for secure clamping engagement of the tubes for maintaining them in alignment while connecting the ends of the tubes by welding, each clamp member including a recess in each side edge thereof providing access to the periphery of the juncture between the ends of the tubes clamped by the clamp members, said means moving the clamp members towards each other including a manually pivotal handle structure including eccentric means connecting the handle structure pivotally to one of said clamp members for moving the clamp members towards and away from each other, means adjustably connecting the handle structure to the other of said clamp members to enable variation in the space between the clamp members when in clamping engagement with the tubes.

2. The structure as defined in claim 1 wherein said means connecting the handle structure to the other of said clamp members includes a mounting bar extending through slot-like openings in each of said clamp members, cam means mounted on the exterior of said other clamp member remote from the handle structure and engaged with the mounting member to adjust the longitudinal position of the mounting member in relation to the clamp members.

3. The structure as defined in claim 2 wherein said cam means is a rotatable cam member mounted on said other clamp member remote from the handle structure, said mounting member for the handle structure including a transverse surface facing inwardly towards the cam member, said cam member including a circular member rotatably mounted on the clamp member and including an axial cam surface engaged with the transverse surface to move the mounting member longitudinally.

4. The structure as defined in claim 3 wherein said mounting member is connected to the handle structure by a pivot pin, said means connecting the handle structure to said one clamp member including pivot pin means spaced from the connection between the handle structure and the mounting member whereby the pivotal connection between the handle structure and mounting member moves in an arcuate path to move the mounting member longitudinally during pivotal movement of the handle structure.

5. In combination with a boiler tube wall formed by a plurality of closely spaced tubes rigidly connected by webs, a tool for clampingly engaging adjacent ends of a pair of adjacent tubes from which the connecting webs have been removed and retaining the adjacent tube ends in alignment while being connected by welding, said tool comprising a pair of opposed clamp members with each clamp member including a pair of recesses therein to engage adjacent ends of a pair of boiler wall tubes on opposite sides of a juncture between the adjacent ends, means moving the clamp members towards each other for secure clamping engagement of the tubes for maintaining them in alignment while connecting the ends of the tubes by welding, each clamp member including a recess in each side edge thereof providing access to the periphery of the juncture between the ends of the tubes clamped by the clamp members, said means moving the clamp members towards each other including a manually pivotal handle structure.

6. The combination a defined in claim 5 wherein said handle structure is connected to one of said clamp members by a pivot pin and connected to the other clamp member by a mounting bar, a pivot pin connecting the mounting bar to the handle structure in eccentrically spaced relation to the pivot pin connecting the handle structure to said one clamp member to move the clamp members towards and away from each other when the handle structure is pivoted.

7. The combination as defined in claim 6 together with means releasably securing the mounting bar to said other clamp member to enable the mounting bar to be inserted between adjacent tubes in the space from which the connecting web was removed.

8. The combination as defined in claim 7 wherein said releaseable means includes means adjusting the mounting bar longitudinally to enable variation in the relation between the clamp members.

9. The combination as defined in claim 8 wherein said adjusting means includes a laterally extending surface on said mounting bar and a cam mounted on said other clamp member in engagement with the surface on the mounting bar to move the bar longitudinally in relation to the clamp members.

* * * * *